US007610834B2

(12) United States Patent
Erickson

(10) Patent No.: US 7,610,834 B2
(45) Date of Patent: Nov. 3, 2009

(54) TOOL HOLDER ASSEMBLY WITH INTERFERENCE FIT KEY ARRANGEMENT

(75) Inventor: Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 45 days.

(21) Appl. No.: 12/050,546

(22) Filed: Mar. 18, 2008

(65) Prior Publication Data

US 2009/0235790 A1 Sep. 24, 2009

(51) Int. Cl.
*B23C 1/00* (2006.01)
*B23B 29/00* (2006.01)

(52) U.S. Cl. .......................................... 82/160; 409/234

(58) Field of Classification Search .................. 82/160, 82/158; 409/232, 234; 279/43.8, 46.8; 408/239 R, 408/239 A See application file for complete search history.

(56) References Cited

U.S. PATENT DOCUMENTS 4,135,418 A 1/1979 McCray et al.
4,292,866 A 10/1981 Kaczynski
4,736,659 A 4/1988 Erickson
5,245,896 A 9/1993 Erickson et al.
6,343,903 B1 2/2002 Huang et al.
6,619,897 B2 9/2003 Erickson et al.

*Primary Examiner*—Willmon Fridie
(74) *Attorney, Agent, or Firm*—Larry R. Meenan

(57) ABSTRACT

A tool holder assembly includes a tool holder with a shank and a key slot having a surface with an angled portion that forms a non-zero angle with respect to a longitudinal axis of the tool holder assembly. A clamping mechanism includes a support block, a ball canister including a key, and a lock rod. An interference fit key arrangement is provided between the tool holder and the clamping mechanism by an abutment surface located along the first side wall of the key. The abutment surface contacts the angular portion of the key slot to cause the key slot to undergo elastic deformation and allow simultaneous contact between the abutment surface and the angular portion of the key slot and the second side wall of the key and the second surface of the key slot, thereby providing for an interference fit key arrangement between the tool holder and the clamping mechanism when the tool holder assembly is placed in the locked position.

15 Claims, 8 Drawing Sheets

84
90
83
80
89
88
82
86
116
106
65
67
68
66
62
64
78
78
76
60
74
114
110
14
52
100
53
55a
55
51
102
36
48
49
32
38
40
42
43
50
44
30
31
33a
33
28
22
12
24
20
26
Y
Y

Y
Y
12
30
31
33
33a
35
22

Y
Y
62
64
66a
68
76
66
76
60
74

60
Y
Y
62
66a
12
33a
66
31
64
68
33
30
22
16

TOOL HOLDER ASSEMBLY WITH INTERFERENCE FIT KEY ARRANGEMENT

BACKGROUND OF THE INVENTION

There are known mechanisms for releasably holding a toolholder shank in a support block bore when the mechanism actuating member is transversely aligned with respect to the longitudinal axis of the toolholder shank and a support block bore. Such mechanisms and articles are used in the cutting and shaping of workpieces where it is not expedient to use the tool support block in connection with a base member having a bore containing an axially aligned power driven means for axially actuating the locking mechanism in the tool support block. Examples of toolholders and support blocks utilizing releasable locking mechanisms having radial activation are shown in U.S. Pat. Nos. 4,573,824; 4,575,293 and 4,135,418 and 4,736,659.

Conventional cutting units and clamping mechanisms in some tool holder assemblies use a key and key slot for radial location of the cutting tool. The tolerances involved allow for various amounts of clearance that can lead to radial inaccuracies that, in turn, can be a problem in certain machining applications. The dimensions and tolerances currently in use are at their practical limit. Tighter tolerances and smaller clearances would require extra machining operations, thereby increasing the cost of the system.

Accordingly, there is a need for an improved mechanism in this field for aligning the toolholder and the clamping unit, thereby reducing or eliminating any variance in the radial location of the cutting tool.

BRIEF SUMMARY OF THE INVENTION

To solve these and other problems associated with conventional toolholder assemblies, a toolholder assembly comprises a tool holder assembly comprises a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder. The clamping mechanism comprises a support block including a bore extending along the longitudinal axis for receiving the shank of the tool holder; a ball canister received within the bore of the support block, the ball canister including a key formed by a first side wall and a second, opposing side wall; and a lock rod mounted in the support block for reciprocal movement within the tool holder assembly and for urging a locking element radially outwardly to engage the shank of the tool holder when the tool holder assembly is placed in a locked position. An abutment surface located along the first side wall of the key contacts the angular portion of the key slot to cause the key slot to undergo elastic deformation and allow simultaneous contact between the abutment surface and the angular portion of the key slot and the second side wall of the key and the second surface of the key slot, thereby providing for an interference fit key arrangement between the tool holder and the clamping mechanism when the tool holder assembly is placed in the locked position.

In another aspect of the invention, a tool holder assembly comprises a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder. The clamping mechanism comprises a support block including a bore extending along the longitudinal axis for receiving the shank of the tool holder; a ball canister received within the bore of the support block, the ball canister including a key formed by a first side wall and a second, opposing side wall; a lock rod mounted in the support block for reciprocal movement within the tool holder assembly and for urging a locking element radially outwardly to engage the shank of the tool holder when the tool holder assembly is placed in a locked position; and an interference fit screw at least partially inserted into an aperture formed in the support block. The interference fit screw provides an abutment surface that contacts the angular portion of the key slot to cause the key slot to undergo elastic deformation and allow simultaneous contact between the abutment surface and the angular portion of the key slot and the second side wall of the key and the second surface of the key slot when the tool holder assembly is placed in the locked position.

In yet another aspect of the invention, a tool holder assembly comprises a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder. The clamping mechanism comprises a support block including a bore extending along the longitudinal axis for receiving the shank of the tool holder; a ball canister received within the bore of the support block, the ball canister including a key formed by a first side wall and a second, opposing side wall; and a lock rod mounted in the support block for reciprocal movement within the tool holder assembly and for urging a locking element radially outwardly to engage the shank of the tool holder when the tool holder assembly is placed in a locked position. The first side of the key provides an abutment surface that contacts the angular portion of the key slot to cause the key slot to undergo elastic deformation and allow simultaneous contact between the abutment surface and the angular portion of the key slot and the second side wall of the key and the second surface of the key slot when the tool holder assembly is placed in the locked position.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Referring now to FIGS. 1-4, a tool holder assembly 10 is shown according to an embodiment of the invention. In general, the tool holder assembly 10 includes a tool holder 12 and a clamping mechanism 14 for releasably securing the tool holder 12 in the tool holder assembly 10.

Figure 5:
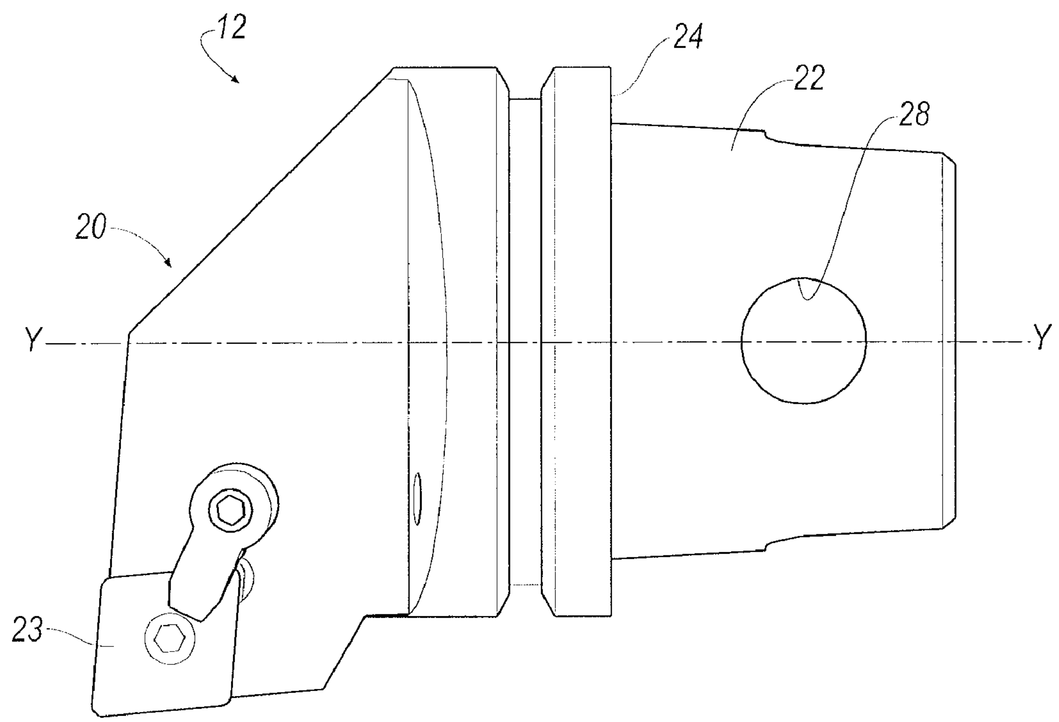
FIG. 5 is a top view of a tool holder according to an embodiment of the invention.
Figure 6:
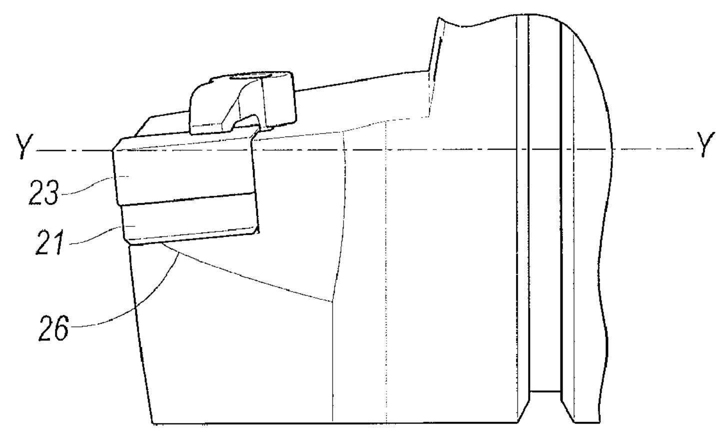
FIG. 6 is a partial side view of the tool holder.

Referring now to FIGS. 5 and 6, the tool holder 12 includes a forward portion 20 and a tubular shank 22. The forward portion 20 is formed with a tool receiving pocket 26 adapted to receive a conventional shim 21 and a cutting insert 23. A flange 24 is formed at the rear of the forward portion 20. The shank 22 extends from the rear face of the flange 24. The shank 22 has a frustoconical shape that tapers inwardly as it extends rearwardly. At the upper end of the shank 22, where it joins the forward portion 20, the shank 22 is smaller in diameter than the flange 24 leaving a rearwardly facing shoulder that extends around the shank 22.

Figure 9:
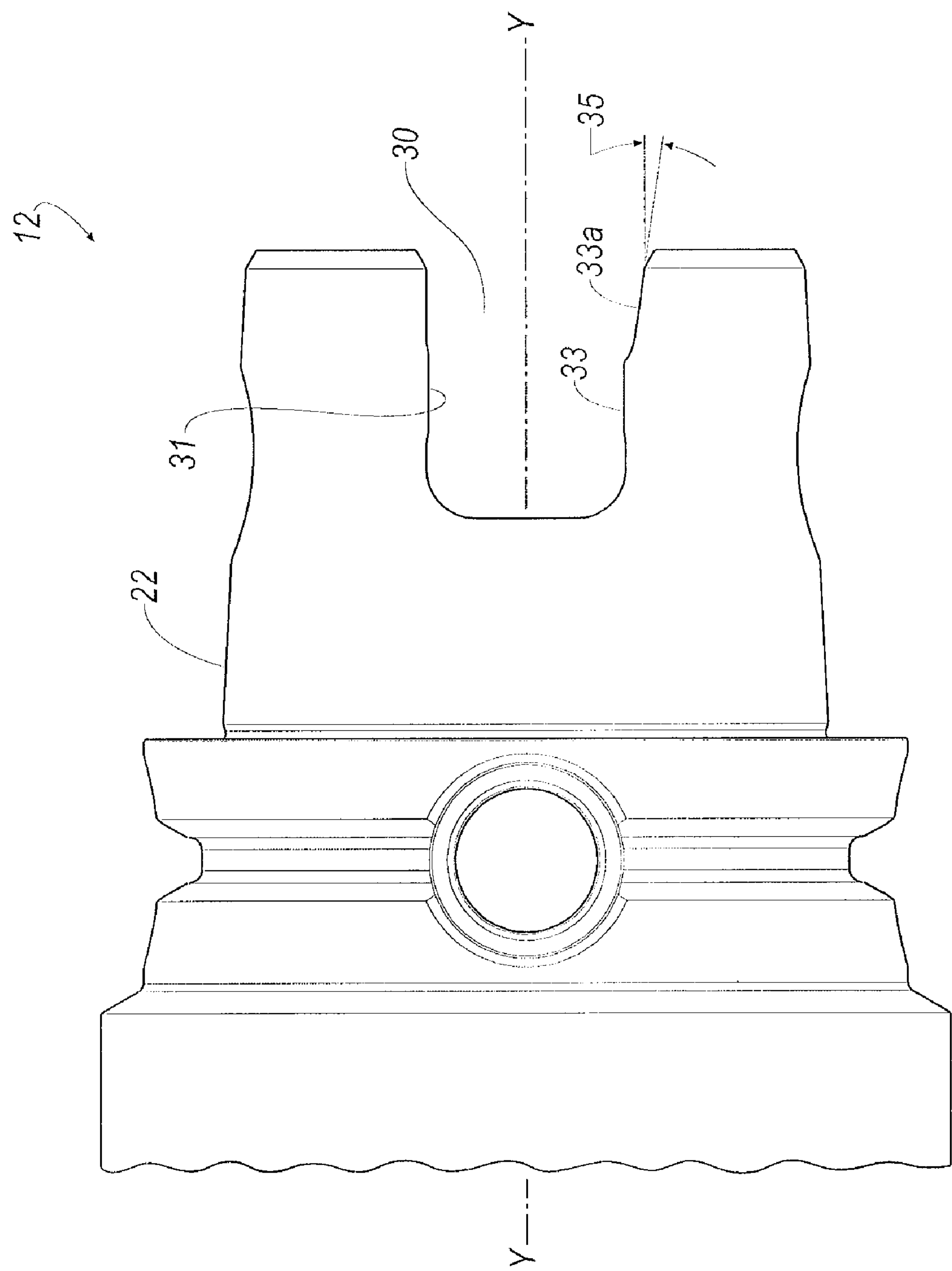
FIG. 9 is an enlarged view of the tool holder shank according to an embodiment of the invention.

Referring back to FIG. 1, the tubular wall of the shank 22 is perforated at two circumferentially spaced locations by apertures 28. The apertures 28 are spaced approximately 180 degrees apart and extend angularly through the tubular wall of the shank 22. The tubular shank 22 also includes two diametrically opposed key slots 30 that are disposed at approximately 90 degrees to the apertures 28. Each key slot 30 forms a surface 31 and an opposing surface 33. The function of the key slots 30 is to cooperatively engage corresponding keys on the clamping mechanism 14, and thus to hold the tool holder 12 against rotation. At least one of the surfaces 31 and 33 of the key slots 30, for example, the surface 33 includes an angled portion **33*a* that is formed at a predetermined, non-zero angle 35 with respect to the longitudinal y-axis (FIG. 9). In one embodiment, the angle 35 is approximately 8 degrees. However, it will be appreciated that the invention is not limited by the particular angle of the angled portion 33*a*** and can be practiced with a desired, non-zero angle depending on design parameters for a specific application.

Figure 1:
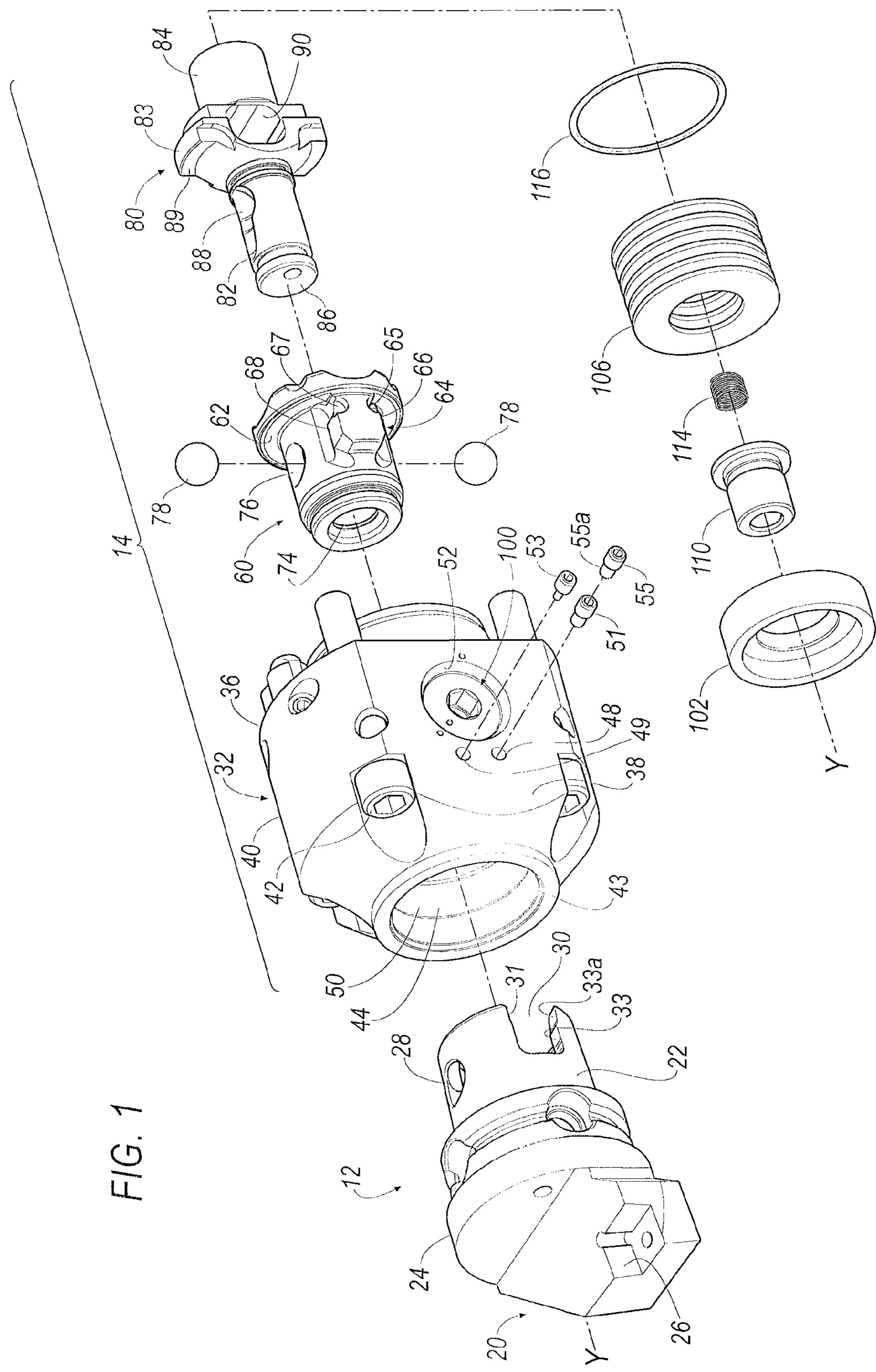
FIG. 1 is an exploded perspective view of a tool holder assembly according to an embodiment of the invention.
Figure 2:
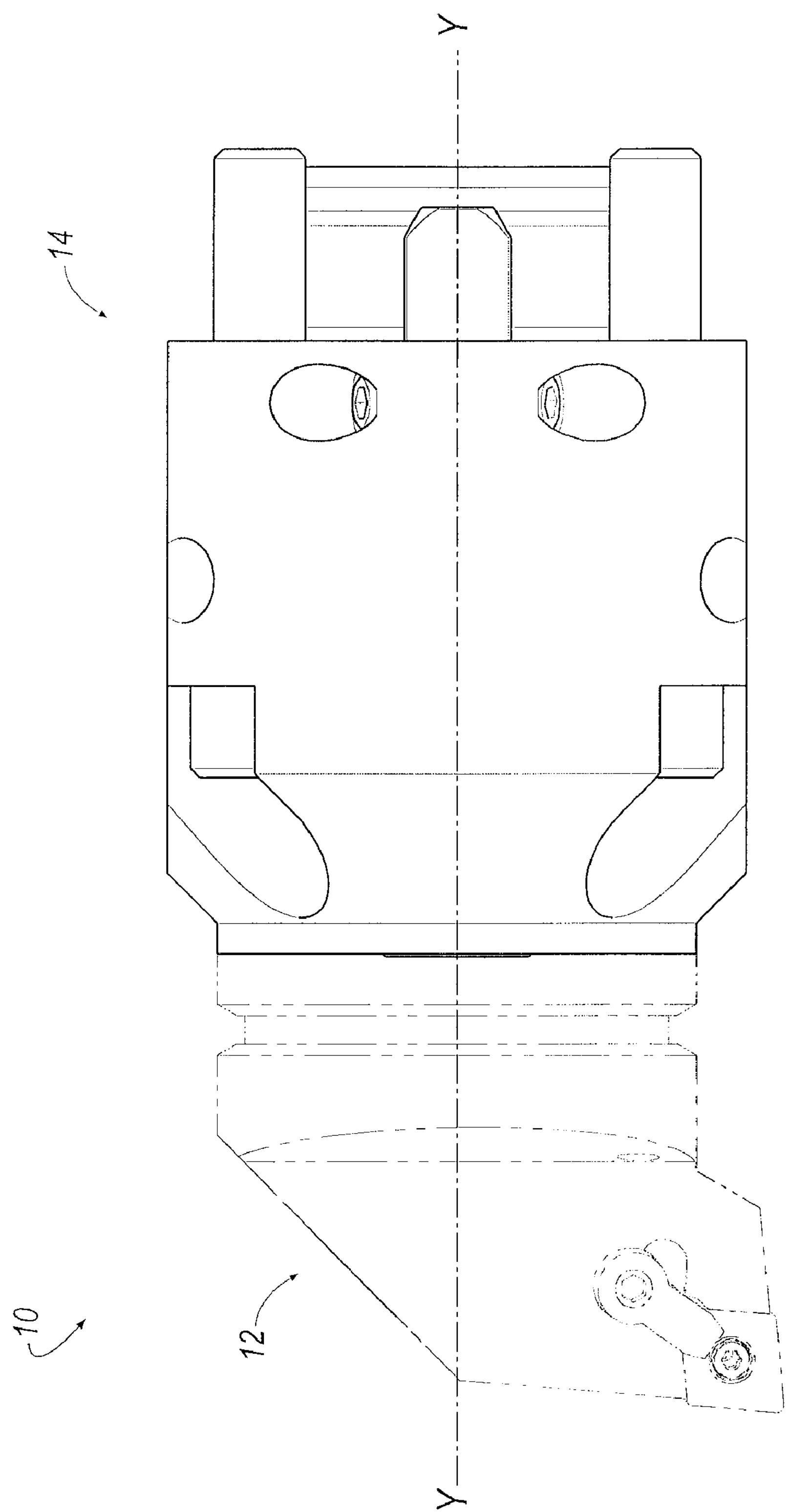
FIG. 2 is a top view of a tool holder of the tool holder assembly.
Figure 3:
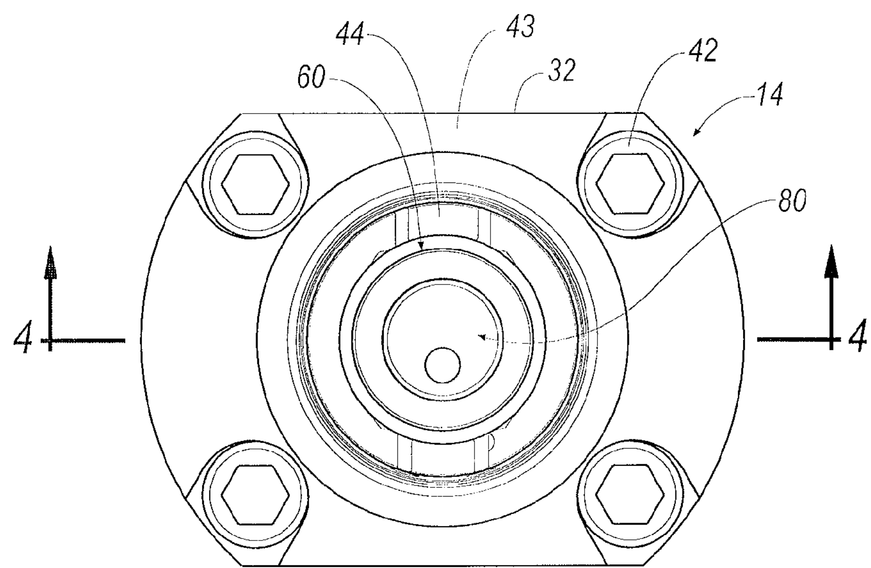
FIG. 3 is an end view of the tool holder assembly.
Figure 8:
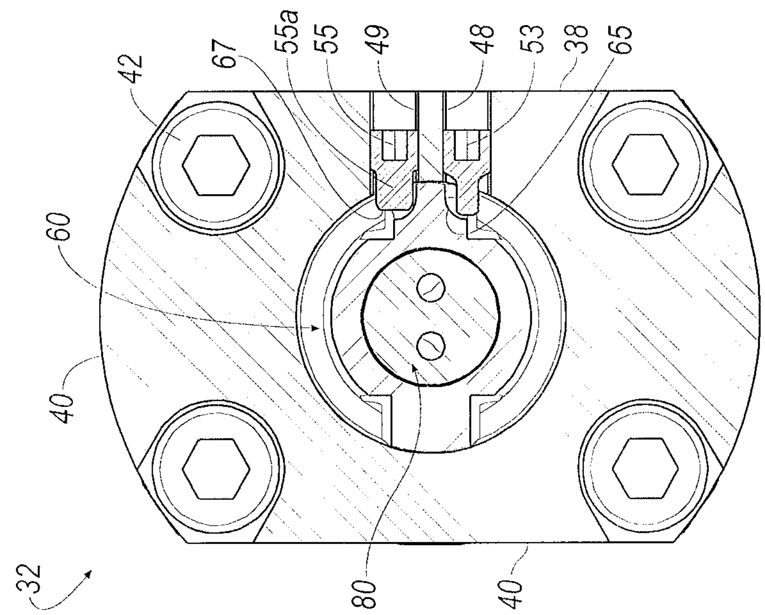
FIG. 8 is a cross-sectional view of the support block and ball canister taken along line 8-8 of FIG. 7.
Figure 7:
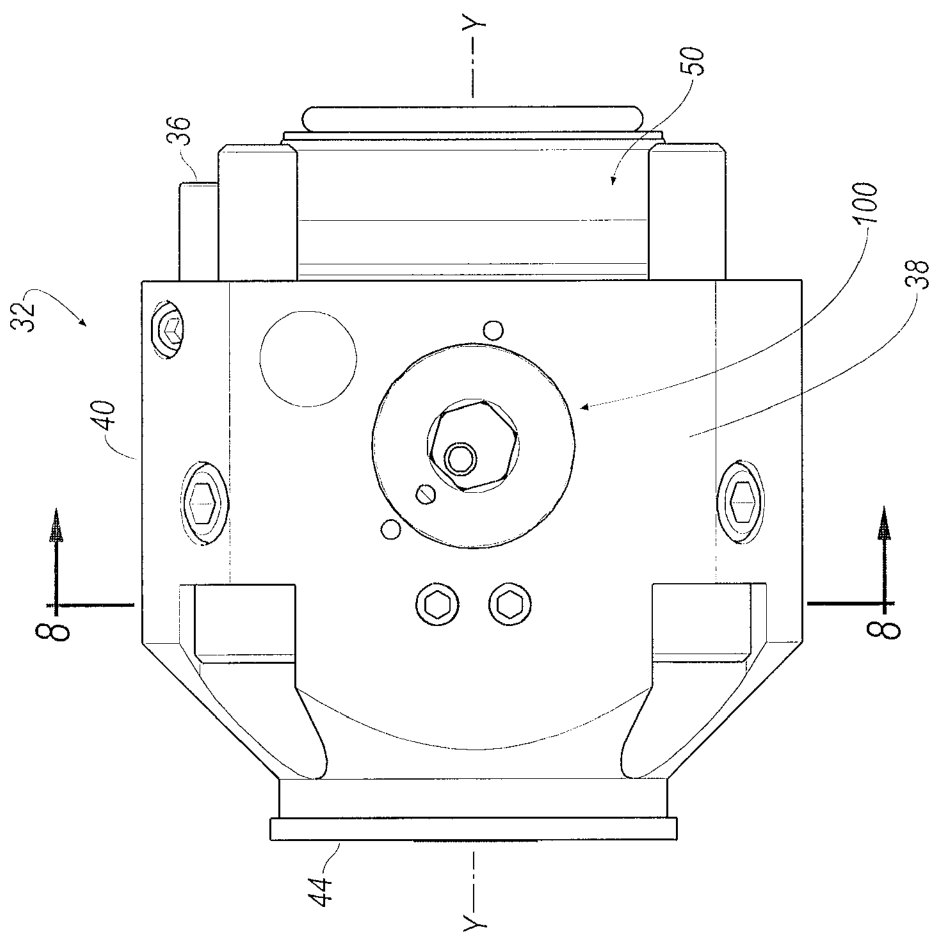
FIG. 7 is a side view of a support block according to an embodiment of the invention.

Referring now to FIGS. 1, 7 and 8, the clamping mechanism 14 includes a support block 32 that has a generally rearward facing surface 36 and side faces 38 and 40. The support block 32 is adapted to be mounted on a turret head of a machine tool (not shown), with the rearward facing surface 36 in contact with the turret head. The support block 32 is secured to the turret head by bolts 42 that extend through four bolt holes. An axial bore 44 extends from the rearward facing surface 36 of the support block 32 along the longitudinal y-axis. Apertures 48, 49 are formed in the side face 38 and are adapted to receive a pair of set screws 51, 53, respectively. In a convention tool holder assembly, the set screws 51, 53 may comprise error-proofing set screws. The support block 32 includes a forward face 43 that contacts the flange 24 of the tool holder 12 when face contact is achieved in the tool holder assembly 10.

In the illustrated embodiment, a tapered bore 50 is integrally-formed with the support block 32. It will be appreciated that the invention is not limited by the sleeve being integrally-formed with the support block, and that the invention can be practiced using a sleeve that is a separate component of the clamping mechanism. The bore 50 serves two functions. First, the bore 50 provides a receptacle into which the tool holder 12 can be inserted. Second, the bore 50 secures a ball canister 60, which is part of the clamping mechanism 14, within the axial bore 44 of the support block 32.

Referring now to FIG. 1, the ball canister 60 is a generally cylindrical structure having a bare flange 62. Integrally formed with the ball canister 60 are two raised keys 64 that are disposed at approximately 180 degrees with respect to one another. The keys 64 are disposed within the support block 32 when the ball canister 60 is inserted into the aperture 44 of the support block 32. Each of the keys 64 includes a first side wall 66 and a second, opposing side wall 68. The set screws 51, 53 are received in slots 65, 67 formed in the opposite sidewalls 66, 68 of the keys 64. The ball canister 60 mounts inside the axial bore 44. An axial passageway 74 extends through the ball canister 60 and aligns with the longitudinal y-axis. Two diametrically opposed apertures 76 are formed in the walls of the ball canister 60.

It will be appreciated that the invention is not limited to the keys 64 being located on the ball canister 60, and that the invention can be practiced with the keys 64 located on other surfaces of the clamping mechanism 14. For example, the keys 64 may be located on the inside surface of the support block 32 in a configuration in which the ball canister 60 is omitted from the tool holder assembly 10.

As shown in FIG. 1, the tool holder shank 22 is secured in the axial bore 44 between the support block 32 and the ball canister 60 by a pair of locking elements 78 which are loosely retained in the apertures 76 of the ball canister 60. In the embodiment shown, the locking elements 78 comprise a pair of hardened steel balls. The locking elements 78 can be urged radially apart to engage the apertures 28 in the tool holder shank 22.

Figure 4:
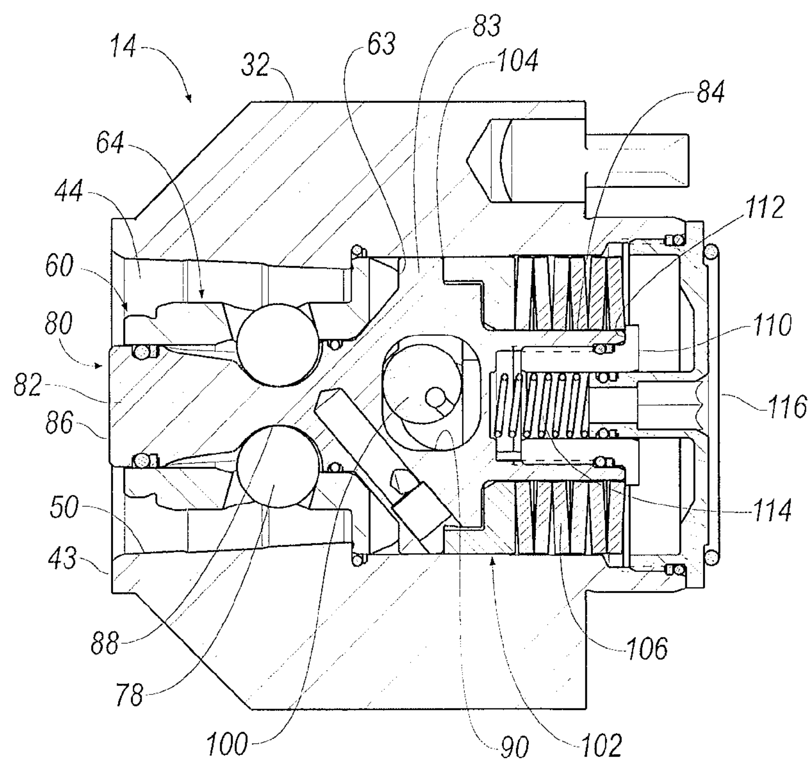
FIG. 4 is a cross-sectional view of the tool holder assembly taken along line 4-4 of FIG. 3.

The clamping mechanism 14 includes a lock rod 80 that is reciprocally mounted in the axial bore 44 of the support block 32 to actuate the locking elements 78. The lock rod 80 includes a front portion 82, a central portion 83 and a rear portion 84. As shown in FIG. 4, the front portion 82 has an end surface 86 that is in substantial alignment with the forward face 43 of the support block 32 when the tool holder 10 is assembled. A pair of concave surface depressions 88 is formed in the front portion 82 of the lock rod 80. The concave depressions 88 are equally spaced from the end surface 86 and are circumferentially spaced at approximately 180 degrees to each other. The depressions 88 are dimensioned to receive the locking elements 78 when the lock rod 80 is in a release position. The depth of the concave depressions 88 is set so that the locking elements 78 can move radially inward sufficiently to disengage from the apertures 28 in the tool holder shank 22, thereby releasing the tool holder 12.

The central portion 83 is larger in diameter than the front portion 82 and forms a shoulder 89 that engages a shoulder 63 in the ball canister 60 to limit the forward movement of the lock rod 80, as shown in FIG. 4. The central portion 83 is formed with a transverse passage 90. The inner walls of the transverse passage 90 are formed with first and second cam surfaces that cooperate with a cylindrical cam 100 to forwardly and rearwardly (along the y-axis) displace the lock rod 80 when the cam 100 is rotated.

The clamping mechanism 14 also includes a cam follower 102 that is disposed around the rear portion 84 of the lock rod 80. When the cam follower 102 is disposed around the lock rod 80, a front portion 104 of the cam follower 102 contacts the central portion 83 of the lock rod 80. One or more disk springs 106 are also disposed around the rear portion 84 of the lock rod 80 and abut a rear surface 103 of the cam follow 102 so as to provide a desired spring force and bias the lock rod 80 along the longitudinal y-axis. When the cam 100 is rotated to place the clamping mechanism 14 in a locked position, the depressions 88 of the lock rod 80 urge the locking elements 78 radially outwardly into engagement with the apertures 28 in the shank 22 of the tool holder 12. The engagement of the locking elements 78 with the apertures 28 of the tool holder shank 22 urges the tool holder 12 rearwardly so that the abutment surface 24 seats against the front face 43 of the support block 32, as shown in FIG. 4. When the cam 100 is rotated to place the clamping mechanism 14 in an unlocked position, the cam 100 contacts the lock rod 80 to forwardly displace the lock rod 80. As the lock rod 80 moves forwardly, the locking elements 88 move radially inwardly into the concave depressions 88 and the end surface 86 engages the tool holder 12 to disengage the tool holder 12 from the clamping mechanism 14.

In the illustrated embodiment, the clamping mechanism 14 also includes a lock rod end cap 110 that is partially inserted into the tubular rear portion 84 of the lock rod 80 until a shoulder 112 of the end cap 110 abuts the rear portion 84 of the lock rod 80. A compression spring 114 may be inserted into the lock rod end cap 110, and a body end cap 116 is attached to the clamping mechanism 14 to seal the clamping mechanism 14.

It will be appreciated that the invention is not limited by the type of clamping mechanism, and that the invention can be practiced with clamping mechanisms that do not involve the use of a lock rod and ball canister for clamping the tool holder 12 in place.

When the shank 22 is inserted into the axial bore 44 formed between the support block 32 and the ball canister 60, the side walls 66, 68 of the keys 64 of the ball canister 60 engage in the key slots 30 in the tubular shank 22. In this manner, the tool holder 12 is held non-rotatable with respect to the clamping mechanism by cooperative engagement of the keys 64 with the key slots 30. However, one problem with this configuration in certain machining applications is that the tolerances involved allow for various amounts of clearance that can lead to radial inaccuracies of the position of the tool holder. The dimensions and tolerances currently in use are at their practical limit. Tighter tolerances and smaller clearances would require extra machining operations, thereby increasing the overall cost of the system. To address this problem, one aspect of the invention is that an interference fit key arrangement is provided that minimizes or eliminates the radial inaccuracies of the position of the tool holder that is associated with conventional tool holder assemblies.

In a conventional clamping mechanism, the set screws 51, 53 may comprise an error-proofing set screw and a plug set screw with two different diameters. Alternatively, the set screws 51, 53 may comprise a pair of plug set screws that have the same diameter. For example, the error-proofing set screw may a diameter of about 6.000 mm and the plug set screw may both have a diameter of about 3.800 mm to allow the tool holder 12 to be placed in the clamping mechanism 14 in either 0 degree or 180 degree orientations.

In one aspect of the invention, the tool holder assembly 10 includes an interference fit key arrangement between the tool holder 12 and the ball canister 60 that comprises an interference fit screw that replaces the error-proofing set screw or one of the plug set screws. For example, the invention can be practiced by replacing the error-proofing set screw 51 with an interference fit screw 55 having a relatively larger diameter. In one example, the interference fit screw 55 having a diameter of about 6.625 mm may replace the conventional error-proofing set screw having a diameter of about 6.000 mm. In another example, the interference fit screw 55 may having a diameter of about 6.625 mm may replace one of the conventional plug set screws having a diameter of about 3.800 mm. Interference fit screws having other relatively larger diameters are within the scope of the invention. It will be appreciated that the clamping mechanism 14 using the interference fit screw 55 of the invention can be retrofit to a conventional clamping mechanism by replacing the interference fit screw 55 with the appropriate smaller diameter error-proofing set screw or plug set screw, thereby bypassing the interference fit key arrangement of the invention.

The interference fit screw 55 having the relatively larger diameter includes a front portion 55*a* that is substantially circular cross-sectional in shape that contacts the angular portion 33*a* of the key slot 30 to cause the key slot 30 to undergo elastic deformation and allow simultaneous contact between the angled portion 66*a* of first side wall 66 and the second side wall 68 of the key 64 and the surface 31 and the angled portion 33*a* of the surface 33 of the key slot 30. In other words, the front portion 55*a* of the interference fit screw 55 is an abutment surface located along the first side wall 66 of the key 64 that contacts the angular portion 33*a* of the key slot 30. This interaction between the interference fit screw 55 and the angular portion 33*a* of the key slot 30 provides for an interference fit key arrangement between the tool holder 12 and the ball canister 60, thereby eliminating any variance in the radial location (in a direction transverse to the longitudinal y-axis) of the tool holder 12 with respect to the clamping mechanism 14.

It will be appreciated that the invention is not limited by the use of the interference fit screw 55 as the abutment surface, and that the invention can be practiced with other comparable means that causes an abutment surface to engage the angular portion on the tool holder. For example, the invention can be practiced using a pin as an abutment surface, rather than a screw, that can be press fit into the aperture 48 on the support block 32.

Figure 10:
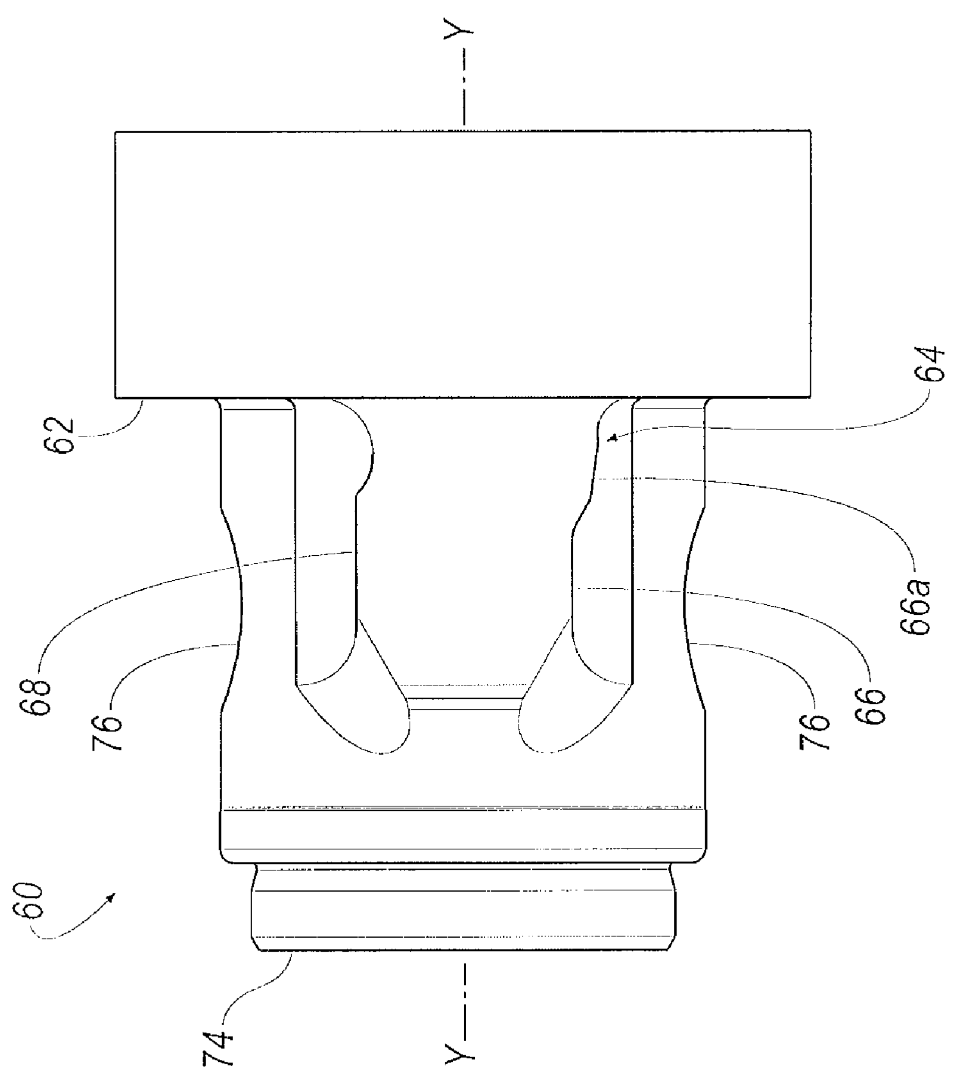
FIG. 10 is an enlarged view of the ball canister according to an embodiment of the invention.
Figure 11:
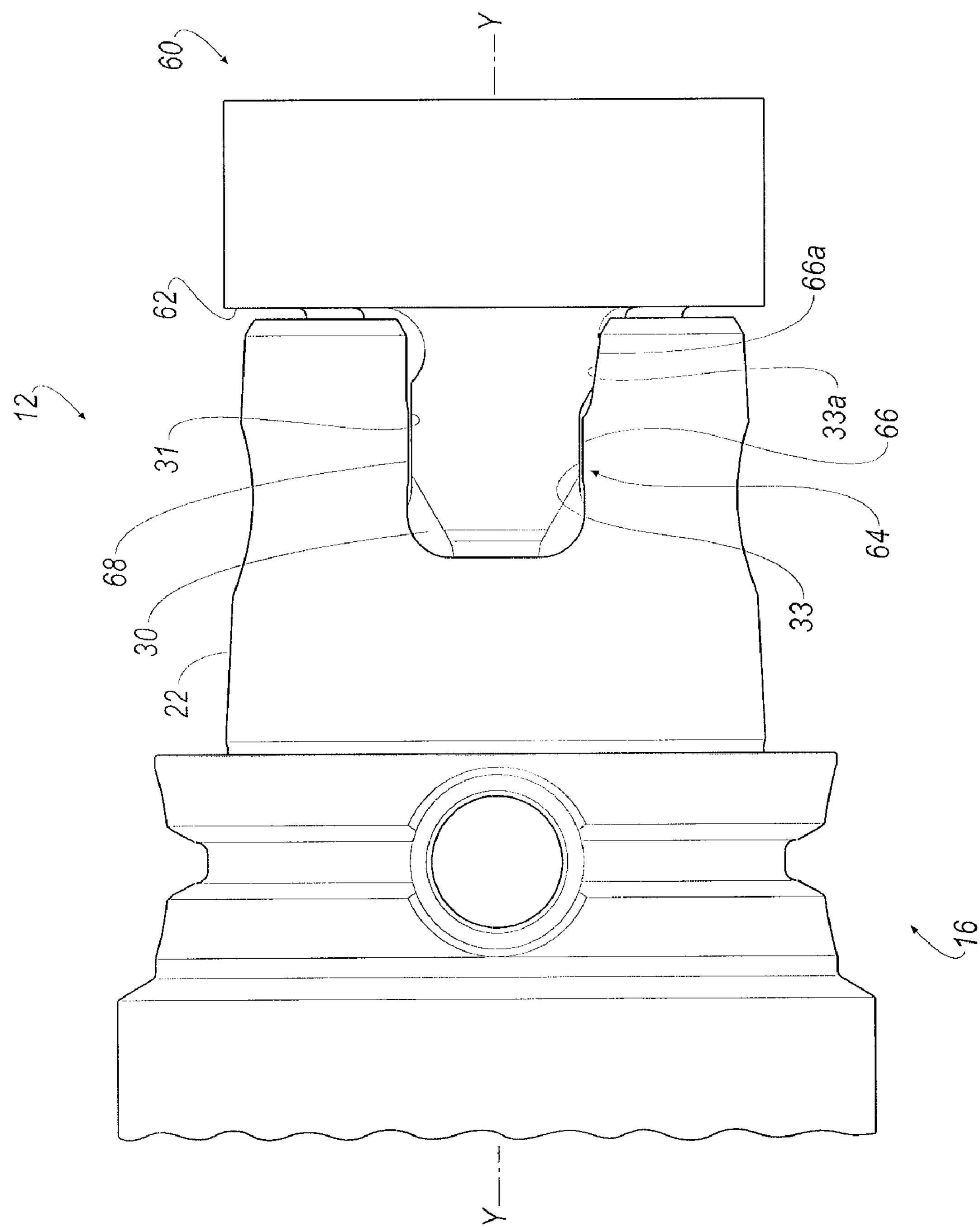
FIG. 11 is an enlarged view of the tool holder shank and ball canister according to an embodiment of the invention.

In another aspect of the invention is shown in FIGS. 9-11. In this aspect, an angled portion 66*a* of the first side wall 66 of the key 64, rather than the front portion 55*a* of the interference fit screw 55, is an abutment surface located along the first side wall 66 of the key 64 to provide for an interference fit arrangement between the tool holder 12 and the clamping mechanism 14. Specifically, when the tool holder assembly is placed in a locked position during the clamping cycle, the angular portion 33*a* of the key slot 30 contacts the angled portion 66*a* of the side wall 66 of the key 64 on the canister 60 to cause the key slot 30 to undergo elastic deformation and allow simultaneous contact between the angled portion 66*a* of the first side wall 66 and second side wall 68 of the key 64 and the surface 31 and the angular portion 33*a* of the surface 33 of the key slot 30, thereby providing for an interference fit key arrangement between the tool holder 12 and the clamping mechanism 14.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A tool holder assembly, comprising:

a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder, the clamping mechanism comprising:

a support block including a bore extending along the longitudinal axis for receiving the shank of the tool holder; and a key disposed within the support block, the key formed by a first side wall and a second, opposing side wall, wherein an abutment surface located along the first side wall of the key contacts the angular portion of the key slot to cause the key slot to undergo elastic deformation and allow simultaneous contact between the abutment surface and the angular portion of the key slot and the second side wall of the key and the second surface of the key slot, thereby providing for an interference fit key arrangement between the tool holder and the clamping mechanism when the tool holder assembly is placed in the locked position.

2. The tool holder assembly according to claim 1, wherein the abutment surface comprises a front portion of an interference fit screw.

3. The tool holder assembly according to claim 1, wherein the abutment surface comprises an angular portion of the first side wall of the key.

4. The tool holder assembly according to claim 1, wherein the non-zero angle is about 8 degrees.

5. The tool holder assembly according to claim 1, wherein the key is located on a ball canister that is received within the bore of the support block.

6. The tool holder assembly according to claim 1, further comprising a lock rod mounted in the support block for reciprocal movement within the tool holder assembly and for urging a locking element radially outwardly to engage the shank of the tool holder when the tool holder assembly is placed in a locked position.

7. A tool holder assembly, comprising:

a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder, the clamping mechanism comprising:

a support block including a bore extending along the longitudinal axis for receiving the shank of the tool holder;

a key disposed within the support block, the key formed by a first side wall and a second, opposing side wall; and an interference fit screw at least partially inserted into an aperture formed in the support block, wherein the interference fit screw includes a front portion that contacts the angular portion of the key slot to cause the key slot to undergo elastic deformation and allow simultaneous contact between the abutment surface and the angular portion of the key slot and the second side wall of the key and the second surface of the key slot when the tool holder assembly is placed in the locked position.

8. The tool holder assembly according to claim 7, wherein the non-zero angle is about 8 degrees.

9. The tool holder assembly according to claim 7, wherein the key is located on a ball canister that is received within the bore of the support block.

10. The tool holder assembly according to claim 7, further comprising a lock rod mounted in the support block for reciprocal movement within the tool holder assembly and for urging a locking element radially outwardly to engage the shank of the tool holder when the tool holder assembly is placed in a locked position.

11. The tool holder assembly according to claim 7, wherein the front portion is substantially circular in cross-sectional shape.

12. A tool holder assembly, comprising:

a tool holder including a shank with a key slot forming a first surface and a second, opposing surface, the first surface including an angled portion forming a non-zero angle with respect to a longitudinal axis of the tool holder assembly; and a clamping mechanism for releasably securing the tool holder, the clamping mechanism comprising:

a support block including a bore extending along the longitudinal axis for receiving the shank of the tool holder;

a key disposed within the support block, the key formed by a first side wall and a second, opposing side wall, wherein the first side of the key includes an angular portion that contacts the angular portion of the key slot to cause the key slot to undergo elastic deformation and allow simultaneous contact between the abutment surface and the angular portion of the key slot and the second side wall of the key and the second surface of the key slot when the tool holder assembly is placed in the locked position.

13. The tool holder assembly according to claim 12, wherein the non-zero angle is about 8 degrees.

14. The tool holder assembly according to claim 12, wherein the key is located on a ball canister that is received within the bore of the support block.

15. The tool holder assembly according to claim 12, further comprising a lock rod mounted in the support block for reciprocal movement within the tool holder assembly and for urging a locking element radially outwardly to engage the shank of the tool holder when the tool holder assembly is placed in a locked position.

* * * * *